United States Patent
Russell (10) Patent No.: US 6,906,852 B1
(45) Date of Patent: Jun. 14, 2005

(54) WAVELENGTH DISCRIMINATED IMAGE DITHERING

(75) Inventor: Andrew Ian Russell, Kingston (JM)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/750,284

(22) Filed: Dec. 31, 2003

(51) Int. Cl.[7] .............................. G02F 1/29; G02F 1/00; G09G 3/00

(52) U.S. Cl. .......................... 359/298; 348/759; 345/32

(58) Field of Search .............................. 359/223, 224, 359/290, 291, 298, 302, 726, 730; 348/750, 755, 756, 759, 760, 771, 574; 345/32

(56) References Cited

U.S. PATENT DOCUMENTS

| 4,827,334 | A | 5/1989 | Johnson et al. ............. 348/752 |
| 5,032,924 | A | 7/1991 | Brown et al. ............... 348/759 |
| 5,105,265 | A | 4/1992 | Sato et al. .................. 348/757 |
| 5,402,184 | A | 3/1995 | O'Grady et al. ............ 348/764 |
| 5,945,967 | A | 8/1999 | Rallison et al. .............. 345/32 |
| 6,184,969 | B1 * | 2/2001 | Fergason .................... 349/196 |
| 6,366,387 | B1 | 4/2002 | Wilson ....................... 359/237 |

FOREIGN PATENT DOCUMENTS

| EP | 0 364043 | A1 | 4/1990 | ............ H04N/9/31 |
| EP | 0 492721 | | 12/1991 | ............ H04N/9/31 |
| EP | 0 492661 | | 7/1992 | ............ H04N/9/31 |
| EP | 0 509630 | | 10/1992 | ............ H04N/9/31 |
| JP | 60-132476 | | 7/1985 | ............ H04N/5/74 |
| JP | 62-203543 | | 9/1987 | ............ H02K/29/00 |
| JP | 63-292880 | | 11/1988 | ............ H04N/5/74 |
| JP | 63-37567 | | 2/1989 | ............ G10D/13/06 |
| JP | 64-47180 | | 2/1989 | ............ H04N/5/74 |
| JP | 2-132476 | | 5/1990 | ............ G03G/15/08 |
| JP | 2-142203 | | 5/1990 | ............ H01Q/13/08 |
| JP | 2-216187 | | 8/1990 | ............ H04N/5/74 |
| JP | 2-250081 | | 10/1990 | ............ H04N/5/74 |
| JP | 3-198037 | | 8/1991 | ............ G03B/21/00 |

* cited by examiner

Primary Examiner—Georgia Epps
Assistant Examiner—William Choi
(74) Attorney, Agent, or Firm—Charles A. Brill; Wade James Brady, III; Frederick J. Telecky, Jr.

(57) ABSTRACT

A method and system for providing a dithered image is provided. In one embodiment, a projector system for providing a dithered image includes a light source comprising a first and a second light emitting diode (LED). The first LED is operable to transmit a first light beam at a first peak wavelength. The second LED is operable to transmit a second light beam at a second peak wavelength. The first peak wavelength is disparate from the second peak wavelength. A digital micromirror device (DMD) is operable to receive the first beam and the second beam and selectively pass a first portion of the first beam and a second portion of the second beam along a projection path. A dichroic reflector operable to receive the first portion and the second portion, passively pass the first portion along the projection path, and substantially reflect the second portion within a wavelength range. An optical mirror operable to receive the substantially reflected second portion and reflect the substantially reflected second portion along an offset path.

22 Claims, 5 Drawing Sheets

WAVELENGTH DISCRIMINATED IMAGE DITHERING

TECHNICAL FIELD

This invention relates generally to displaying images, and more particularly to wavelength discriminated image dithering.

BACKGROUND

Light processing systems often involve combining various primary colors of light on a display such that a particular color and/or image is produced. One way of effecting such combination is through the use of digital micromirror devices (DMD) available from Texas Instruments. In general, primary colors of light are shined on a DMD array having numerous micromirrors. Each micromirror is selectively controlled to reflect each primary color of light onto a particular portion of a display, such as a pixel. Each micromirror can be used to switch a pixel on or off by changing an angle of a corresponding mirror. The pixels of the DMD can maintain their "on" or "off" state for controlled display times. Conventionally, either three or more separate color-specific light sources are used or a single white-light source is used in combination with a color wheel to provide at least three primary colors that can be mixed on the display. Each individual micromirror reflects a color-specific light for an appropriate period of time such that the viewer's eye integrates the various colors and perceives an image made up of a plurality of different colors.

Conventionally, each micromirror device corresponds to a pixel on the display. Thus the resolution of the display is limited by the number of micromirrors that can be effectively manufactured. Consumers are desirous of having increased resolution. Thus, approaches to increase the resolution of the display have been developed.

One such approach is sometimes referred to as dithering, in which the display is shifted a fraction of a pixel, giving the illusion of double the resolution than that which would normally occur. One challenge with such a technique is achieving the shift. One approach utilizes a mirror that receives the light otherwise intended for the display and reflects it onto the display in a shifted position or a non-shifted position.

SUMMARY OF THE INVENTION

A method and system for providing a dithered image is provided. In one embodiment, a projector system for providing a dithered image includes a light source comprising a first and a second light emitting diode (LED). The first LED is operable to transmit a first light beam at a first peak wavelength. The second LED is operable to transmit a second light beam at a second peak wavelength. The first peak wavelength is disparate from the second peak wavelength. A digital micromirror device (DMD) is operable to receive the first beam and the second beam and selectively pass a first portion of the first beam and a second portion of the second beam along a projection path. A dichroic reflector operable to receive the first portion and the second portion, passively pass the first portion along the projection path, and substantially reflect the second portion within a wavelength range. An optical mirror operable to receive the substantially reflected second portion and reflect the substantially reflected second portion along an offset path.

Technical advantages of some embodiments of the invention may include providing an enhanced projector system for displaying an image. Other advantages of one or more embodiments may include enhancing the image of a projected image by dithering the projected image. Yet another advantage of one or more embodiments of the present invention may include providing a projected image and an offset image without the use of electrical or mechanical devices.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and features and advantages thereof, reference is now made to the following description, taken in conjunction with the accompanying drawings, in which.

DESCRIPTION OF EXAMPLE EMBODIMENTS

Figure 1:
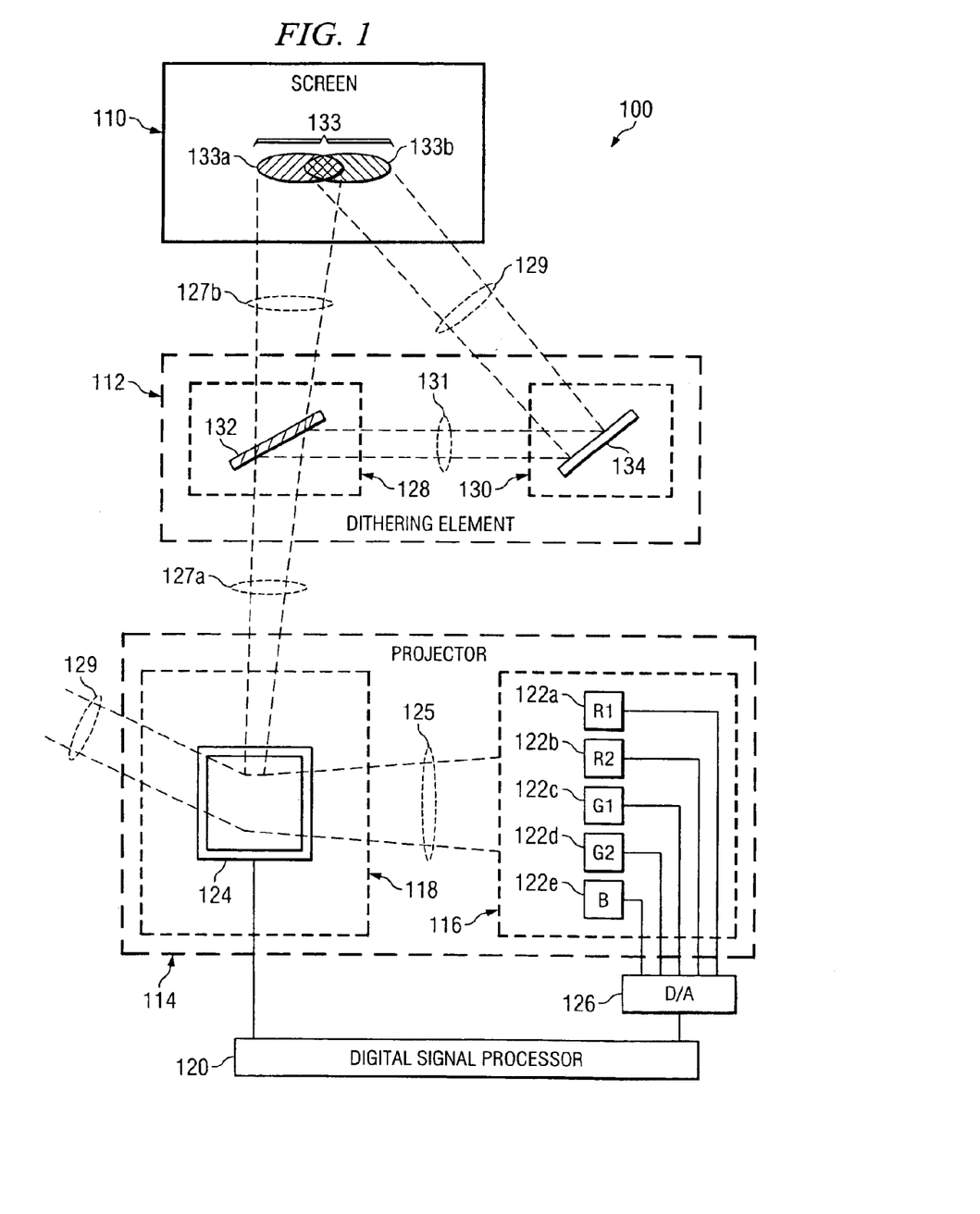
FIG. 1 is a block diagram of a projection system.

FIG. 1 illustrates one embodiment of a projection display system 100 that uses a dithering element 112 to provide a dithered image. Projection display system 100 includes a digital signal processor 120, a projector 114, a dithering element 112, and a screen 110. In general, digital signal processor 120 provides image information associated with a color image to projector 114. Dithering element 112 receives color-specific images from projector 114 and provides a projection image 133A and an offset image 133B for display on screen 110. Other embodiments of projection display system 100 may be employed without departing from the scope of this disclosure.

Projector 114 is optically coupled to dithering element 112 and is operable to provide color-specific image to dithering element 112. A "color-specific image", as used herein, means a monochromatic portion of a color image. Projector 114 is electrically coupled to digital signal processor 120 and is operable to receive information associated with a color image for display on screen 110. Based on this information, projector 114 may sequentially provide color-specific images such that the superposition of the color-specific images may be perceived as the color image. For example, projector 114 may sequentially provide a red, green, and blue image; however, the display of color-specific images is not limited to a sequential display but may be displayed in any order or pattern. Each color-specific image may be spatially disparate from other color-specific images. Referring to FIG. 1, projector 114 includes a spatial modulator 118 optically coupled to a light source 116. Modulator 118 receives a color-specific light beam from light source 116 and provides a spatially modulated light beam to dithering element 112. Both light source 116 and dithering element 112 may be optically coupled to modulator 118 through lenses, collimators, or other suitable optical devices.

Light source 116 is a device that emits, in one embodiment, color-specific light beams in the direction of modulator 118 to initiate processing of the color-specific light beam and is operable to receive an electric signal from digital signal processor 120. Additionally, light source 116 is operable to provide color-specific light beams to modulator 118. A "color-specific light beam," as used herein, means a light beam that emits narrow-bandwidth radiation such that the distribution of light is perceived as monochromatic. For example, a color-specific light beam may include a green light beam centered around 506 nm with a bandwidth of 40 nm. Narrow-bandwidth sources may include semiconductor lasers, light-emitting diodes (LEDs), injection laser diodes (ILDs), vertical cavity surface emitting diodes (VCSELs), an array of light sources, lasers, or any other suitable source that emits light within a narrow bandwidth. Alternatively, light source 116 may comprise a color wheel and a white-light source. A color wheel is a disk-shaped member in which primary colored (e.g., red, green, and blue) filters are arranged radially. In this case, the color wheel is rotationally driven while the white-light source provide illumination light for the filters. As a result, the color wheel sequentially separates the illumination light into the primary color wavelength regions, such as red, green, and blue wavelength regions. As compared to narrow-bandwidth sources, white light sources are broadband sources that are perceived as achromatic or white.

Figure 2A:
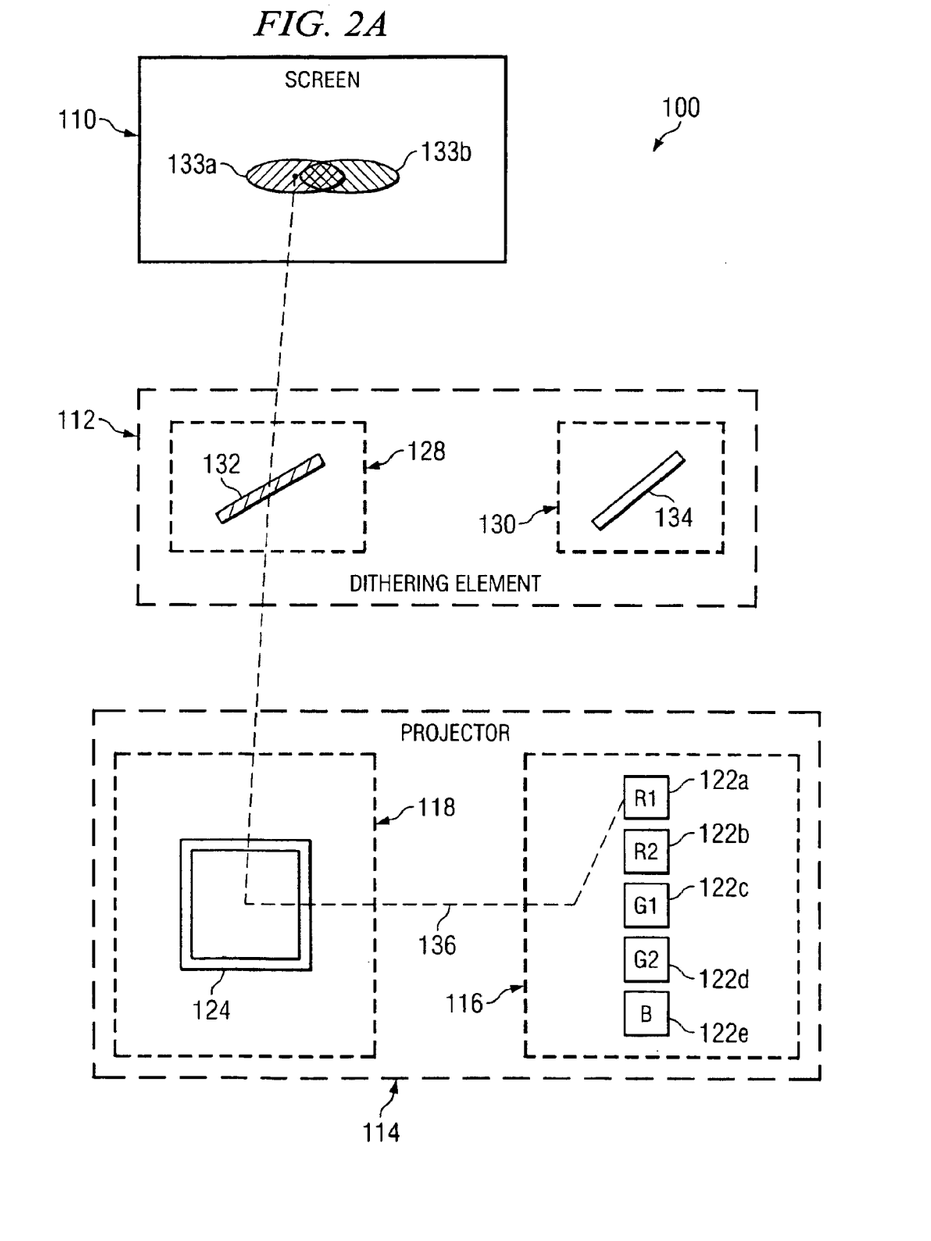
FIGS. 2A and 2B illustrates the path that a projection beam and a dithering beam traverse, respectively, in the projection system of FIG. 1.

In the illustrated embodiment, light source 116 includes light-emitting diodes (LEDs) 122. Each LED 122 is electrically coupled to digital signal processor 120 via a digital to analog (D/A) converter 126 and optically coupled to modulator 118. Each LED 122 transmits a color-specific light beam within a narrow-bandwidth centered around a peak wavelength. As discussed in more detailed below, FIG. 2A illustrates an example spectrum of light source 116. In the illustrated embodiment, light source 116 includes a red LED 122a, a red LED 122b, a green LED 122c, a green LED 122d, and a blue LED 122e. Alternatively, light source 116 may include a first and a second blue LED 122. Both red LED 122a and red LED 122b transmit spectrally proximate red light beams in the direction of modulator 118. Spectrally proximate light beams, as used herein, means that each light beam is perceived to be substantially the same color but the peak wavelength of both is sufficiently separated on the electromagnetic spectrum such that optical components can discriminate between each beam. Green LED 122c and green LED 122d transmit spectrally proximate green light beams in the direction of modulator 118. Although, not illustrated, several optical components may exists between light source 116 and modulator 118 to assist in providing modulator 118 at least a portion of the transmit color-specific light beam. Furthermore, when referring to providing a color-specific light beam to modulator 118 this contemplates that the entire emitted color-specific light beam may not be provided to modulator 118.

Digital signal processor 120 is coupled to light source 116 and modulator 118. In certain embodiments, digital signal processor 120 is coupled to light source 116 through D/A converter 126. According to particular embodiments, digital signal processor 120 generates and digitizes an input sequence that drives light source 116. The input signal may be digitized via pulse-code-modulation (PCM) or pulse-width-modulation (PWM) to produce an input signal with digital precision. If present, D/A converter 126 converts the digital input signal to an analog control signal, which is communicated to and controls light source 116. If the input sequence was digitized using PWM, then D/A converter 126 is not necessary. Digital signal processor 120 is further operable to configure and program modulator 124 to allow modulator 124 to process analog optical signals with digital precision.

Modulator 118 may comprise any device capable of selectively communicating at least some of the illumination light beam along a projection path 127 and/or along an off-state light path 129. In the illustrated embodiment, modulator 118 comprises a digital micromirror device (DMD) 124. DMD 124 is a digital form of a spatial light modulator that acts as a matrix mask configured by digital signal processor 120. In general, DMD 124 processes light beams received from light source 116 into a color specific image, based on the configuration of DMD 124, and reflects the resulting image to dithering element 112 along projection path 127. In one embodiment, DMD 124 is an electro-mechanical device including a pixel array, such as a 768× 1024 array, of digital tilting mirrors or baseline binary pixels or mirrors. Each binary mirror may tilt by a plus or minus angle (e.g., 10 or 12 degrees) for the active "on" or "off" positions. To permit the mirrors to tilt, each is attached to one or more actuators such as, for example, hinges mounted on support posts over underlying control circuitry. The control circuitry provides electrostatic forces that cause each mirror to selectively tilt. Incident light on the mirror array is reflected by the "on" mirrors along the projection path 127A and by the "off" mirrors along the off-state path 129. The configurable pattern of "on" versus "off" mirrors forms, in part, the color-specific image. Accordingly, dithered image 133 is light that is reflected by the "on" mirrors in DMD 124 and is generally projected to dithering element 112.

Dithering element 112 is, in one embodiment, operable to receive spatially modulated light beams from projector 114 and passively drop a portion of a light beam transmitted along projection path 127A to provide an offset beam 129 with the remaining light passing through dithering element 112 along projection path 127B. Passively, as used herein, means without the use of power, electricity, and/or moving parts. Furthermore, dithering element 112 is, in one embodiment, operable to receive at least two spectrally proximate light beams and passively drop one of the beams from projection path 127 to provide the dropped beam along offset path 129, with the remaining beam passing through the dithering element along projection path 127B. For example, dithering element 112 may be operable to receive the spectrally proximate red light beams associated with red one LED 122a and red two LED 122b. In this embodiment, dithering element 112 is operable to pass the wavelength associated with red one LED 122a along projection path 127B and passively drop the wavelength associated with red two LED 122B to provide the beam along offset path 129. Dithering element 112 may comprise dichroic reflectors, fixed Bragg gratings, sub-band rejection filters, lenses, mirrors, prisms, any combination of the foregoing, or other optical components operable to passively drop light beams within a bandwidth of the electromagnetic spectrum and provide an offset beam. While dithering element 112 is illustrated as disparate from projector 114, projector 114 may comprise dithering element 112.

Dithering element 112 includes, in the illustrated embodiment, an optical selecting element 128 and an optical directional element 130. Optical selecting element 128 is operable to receive a light beam transmitted along projection path 127A and route a portion of at least a color-specific light beam along rejection path 131 while passing through the remaining wavelengths. In the illustrated embodiment, optical selecting element 128 includes a dichroic reflector 132 that is operable to reflect wavelengths within certain bandwidths along rejection path 131, while passing the remaining wavelengths along projection path 127B. A dichroic reflector 132 may be formed by depositing a dielectric multilayer film on a given glass substrate. Optical selecting element 128 may comprise other components operable to discriminate between spectrally proximate light beams. Optical directional element 130 is operable to receive the reflected light beams transmitted along rejection path 131 and pass the reflected light beam along offset path 129. In the illustrated embodiment, optical directional element 130 includes an optical mirror 134 operable to reflect an incident light beam along offset path 129. It will be understood that optical directional element 130 may comprise other optical components operable to receive a light beam and pass the light beam along offset path 129, which may include lenses, mirrors, collimators, any combination of the foregoing, or any other suitable optical components.

Screen 110 is operable to receive light beams transmitted along projection path 127B and offset path 129 to generate dithered image 133. A dithered image, as used herein, means spatially overlapping one image by a substantially similar image, which may be not be temporally overlapped. In the illustrated embodiment, dithered image 133 includes a projected image 133A and an offset image 133B. Both projected image 133A and offset image 133B may comprise spectrally proximate light. In this case, projected image 133A is overlapped by a substantially similar image in color and spatial modulation, i.e., the offset image 133B. In one embodiment, projected image 133A and offset image 133B are offset by one half a pixel horizontally and by one half a pixel vertically. In the illustrated embodiment, offset image 133B includes green and a red offset images whose display is temporally separated, and projection image 133B includes red, green, and blue images whose display is also temporally separated. Both red images may be temporally separated, and both green images may be temporally separated. Alternatively, both red images may be displayed simultaneously, and both green images may be displayed simultaneously. A sequential display of these images are perceived as a superposition of the various color-specific images resulting in a perceived display of the color image.

In one aspect of operation, digital signal processor 120 receives digital information associated with a color image for reproduction on screen 110. Digital signal processor 120 generates and digitizes an input sequence that drives each LED 122 independently. D/A converter 126 may convert the digital input signal to an analog control signal, which is communicated to and controls LEDs 122 independently. Additionally, digital signal processor 120 transmits control signals to DMD 124. According to the input signal, light source 116 transmits a color-specific light beam along initial light path 125. For example, the light beam transmitted by light source 116 may comprise a red light beam including red light generated by red LED 122a and red light generated by red LED 122b. Under certain operating conditions, the red light generated by red LED 122a and the red light generated by red LED 122b are not transmitted simultaneously and thus their transmission is temporally separated. Based on the control signal received by DMD 124, DMD alters the configuration of its micromirrors to spatially modulate the red light beam according to the image information and reflect the relevant light along projection path 127A. Dichroic reflector 132 receives the spectrally proximate red light beams, and reflects the red light beam associated with red LED 122b along rejection path 131 and passes through the red light beam associated with red LED 122a along projection path 127B. Optical mirror 134 receives the red light beam transmitted along rejection path 131 and reflects the received beam along offset path 129. Screen 110 receives the spectrally proximate red light beams transmitted along projection path 127B and the red light beam transmitted along offset path 129 such that the displayed beams spatially overlap to generate dithered image 133. As mentioned above, projection image 133A and offset image 133B may not temporally overlap.

Figure 2B:
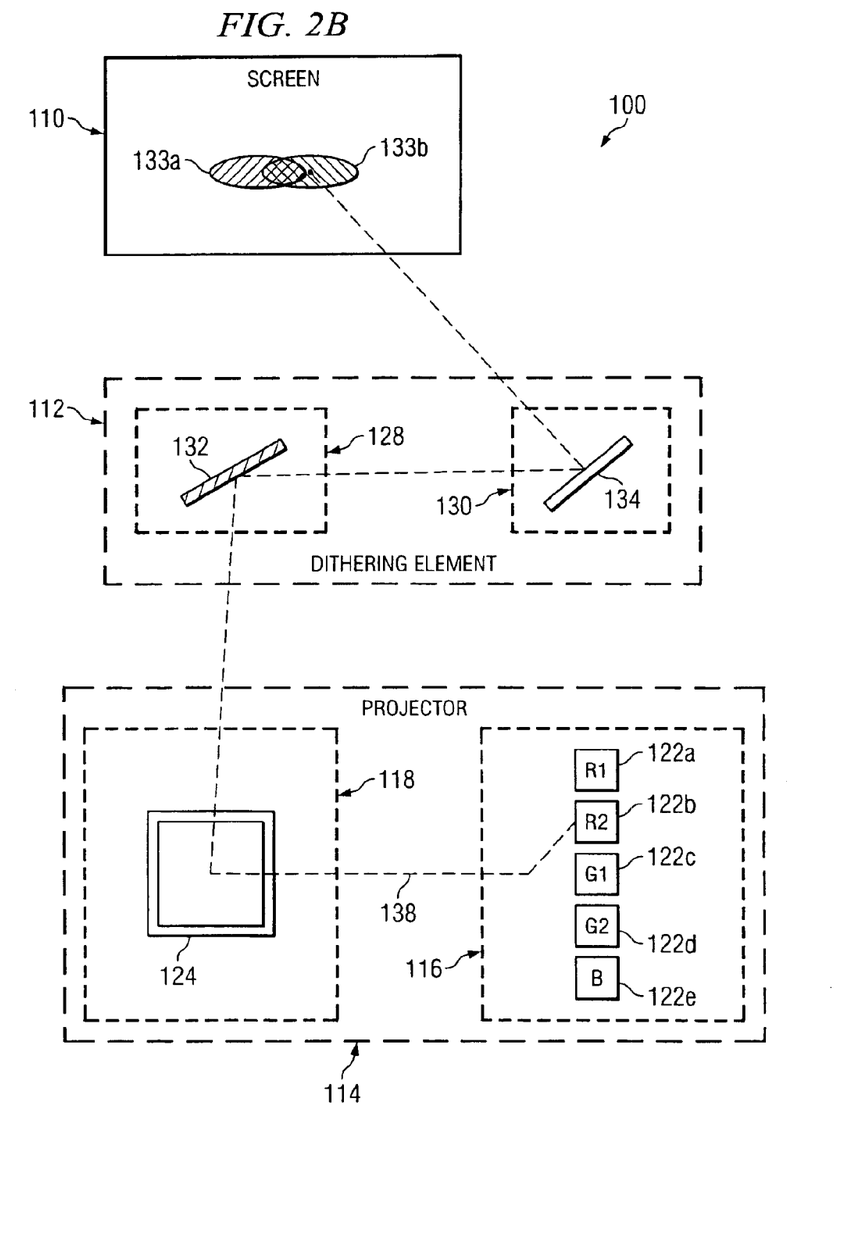

FIGS. 2A and 2B illustrated the transmission paths of two spectrally proximate light beams in system 100. For example, these FIGS. 2A and 2B may illustrate the transmission path that red light beams emitted by red LED 122b and red two LED 122b traverse, respectively. In particular, FIG. 2A illustrates a projection path 136 of a light beam that passes through dithering element 112. Red LED 122a emits narrow-band radiation within the red portion of the visible light spectrum. DMD 124 receives the red light beam and spatially modulates the beam. The spatially modulated beam is reflected generally toward dithering element 112. In this case, the red light from red LED 122a does not fall within the bandwidth reflected by dichroic reflector 132. As a result, this red light beam passes through dichroic reflector 132 to screen 110, which displays projection image 133A generated by this red light beam.

In comparison, FIG. 2B illustrates a dithering path 138 of a light beam that is passively dropped by dithering element 112. Red LED 122b emits narrow-band radiation with the red portion of the visible light spectrum that is spectrally proximate light from red LED 122a. DMD 124 receives the red light beam and spatially modulates the beam such that the spatially modulated beam is substantially similar in color and spatial modulation to the red light transmitted along projection path 127. The spatially modulated beam is also transmitted toward dithering element 112. By comparison to red LED 122a, the red light from red LED 122b does fall within the bandwidth reflected by dichroic reflector 132, which reflects this beam along reflection path 131 to optical mirror 134. Optical mirror 134 reflects this red light beam along offset path 129 to screen 110, which displays offsets image 133B generated by the offset red light beam. Projection image 133A is spatially overlapped by offset image 133B, resulting in overlapping projection 133A with a copy of projection image 133A.

Figure 3A:
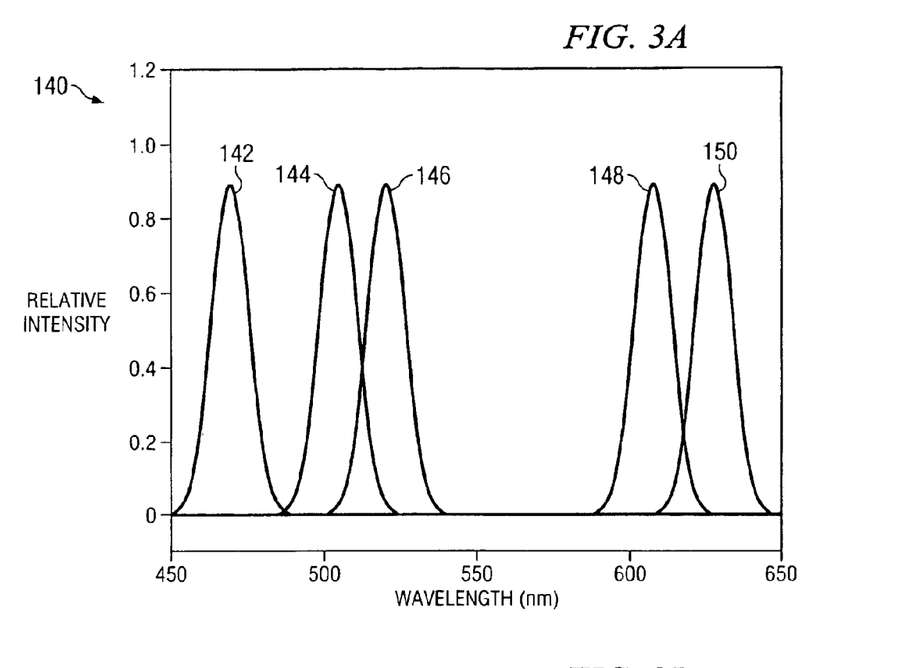
FIG. 3A is a graph of relative intensity versus wavelength for a light source illustrated in FIG. 1.

FIG. 3A is a graph of relative intensity versus wavelength illustrating an example spectral distribution of light source 116. Graph 140 includes peaks 142, 144, 146, 148, and 150, which depict spectral distributions of five LEDs 122. As illustrated, each peak has a narrowband distribution ranging over approximately 40 nm and centered around a peak wavelength. Peaks 142, 144, 146, 148, and 150 represent a blue, green two, green one, red two, and red one light distribution, respectively. Peaks 144 and 146 are spectrally proximate and peaks 148 and 150 are spectrally proximate.

Figure 3B:
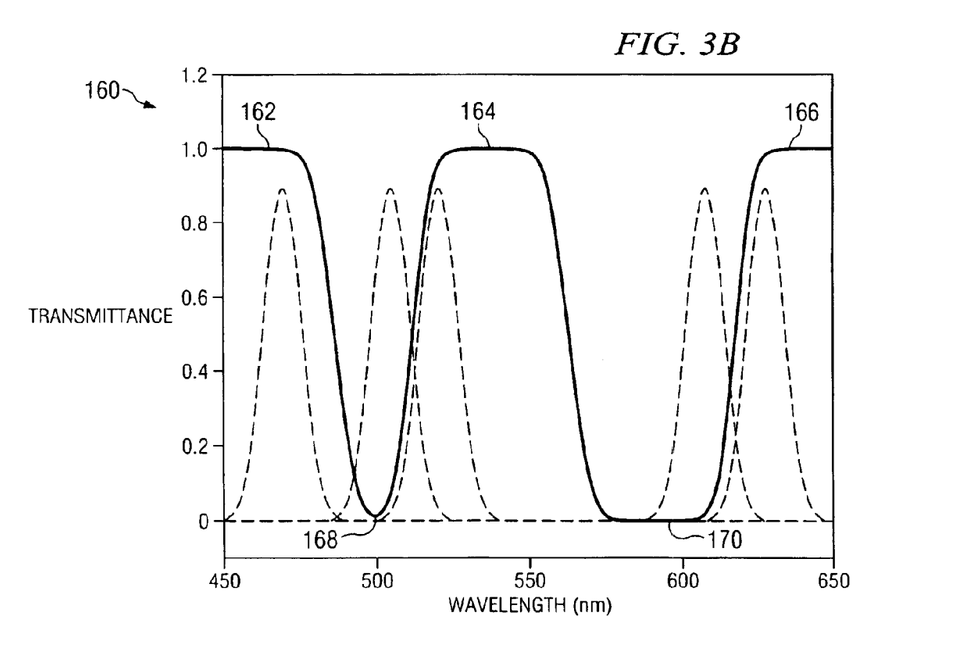
FIG. 3B is a graph of relative transmittance versus wavelength for light incident on a dichroic reflector illustrated in FIG. 1.

FIG. 3B is a graph 160 of relative transmittance versus wavelength of dichroic reflector 132. Mesas 162, 164, and 166 illustrate regions that pass light beams through dichroic reflector 132. In contrast, valleys 168 and 170 represent regions of the spectrum that are substantially reflected by dichroic reflector 132. As illustrated, green light emitted from green two LED 122D is substantially reflected by dichroic reflector 132. Red light emitted by red two LED 122B is substantially reflected by dichroic reflector 132.

Figure 4:
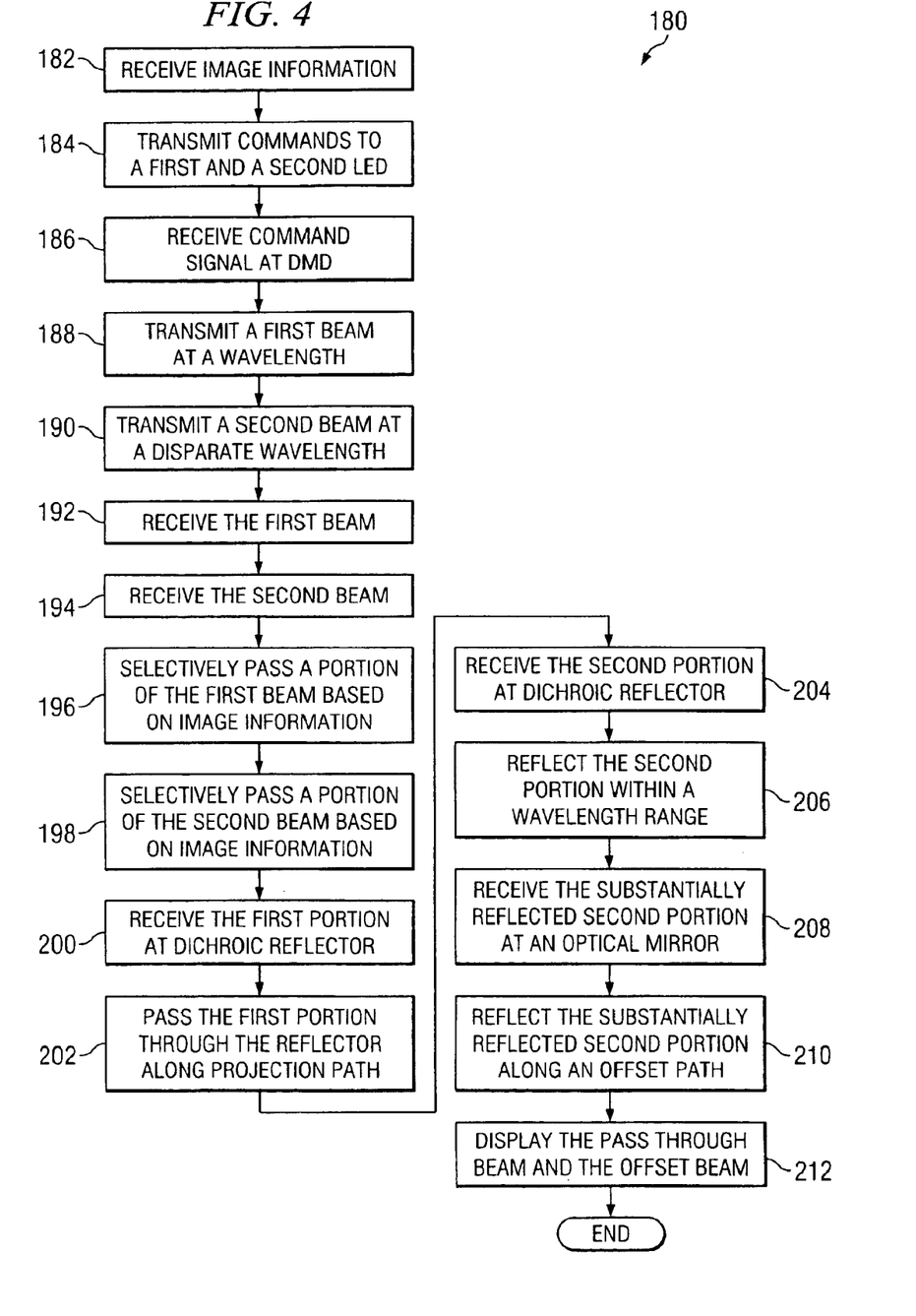
FIG. 4 illustrates an example method for projection a dithered image.

FIG. 4 illustrates a flowchart of an example method 180 for providing a dithered image on screen 110. Method 180 is described in respect to system 100. However, any other suitable system may use method 180 to provide a dithered image without departing from the scope of this disclosure. Generally, method 180 describes screen 110 receiving a projection image and an offset image to produce dithered image 133.

Method 180 begins at step 182 where digital signal processor 120 receives image information. Image information may have originated from a variety of sources such as digital, digital compressed, digital graphics, analog composite, analog s-video, analog graphics, or any other suitable source. Next, at step 184, digital signal processor 120 transmits commands to red LED 122a and red LED 122b via D/A converter 126. The input signals for both LEDs 122a and 122b may be digitized via PCM or PWM to produce an input signal with digital precision. Digital signal processor 120 also transmits commands to DMD 124 operable to change the configuration of DMD 124 based on the color of the light beam transmitted by LED 122a and 122b. The configuration of DMD 124 may be otherwise suitable based on the transmitting LED 122. At step 188, red LED 122a transmits a red light beam at a first red wavelength. Red LED 122b transmits a second red light beam at a disparate red wavelength that is spectrally proximate the first red wavelength at step 190. As discussed above, under certain operating conditions, the red light beam transmitted by red LED 122a and the red light beam transmitted by red LED 122a are temporally separated. Next, at step 192, DMD 124 receives the first red light beam transmitted along incident light path 125. At step 194, DMD 124 receives the second red light beam transmitted along incident light path 125. DMD 124 selectively passes at least a portion of the first red light beam along projection path 127a based on its configuration. At step 198, DMD 124 selectively passes at least a portion of the second red light beam along projection path 127a based on DMD 124's configuration. Dichroic reflector 132 receives the selectively passed portion of the first red light beam transmitted along projection path 127a. At step 202, dichroic reflector 132 passes the selectively passed portion of the first red light beam through the dichroic reflector 132 and along projection path 127b. Next, at step 204, dichroic reflector 132 receives the selectively passed portion of the second red light beam transmitted along projection path 127a. At step 206, dichroic reflector 132 reflects the selectively passed portion of the second red light beam along reflected path 131. Optical mirror 134 receives the reflected light beam transmitted along reflected path 131 at step 208. Optical mirror 134 reflects the incident offset beam propagating along reflected path 131 along offset path 129 at step 210. At step 212, screen 110 receives the pass through beam and the offset beam to display dithered image 133.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for providing a dithered image in a digital light processing system, comprising:
   transmitting a first light beam from a first light-emitting diode (LED) at a first wavelength and a second light beam from a second LED at a second wavelength, the first wavelength spectrally proximate the second wavelength;
   receiving the first and second beam at a digital micromirror device (DMD);
   selectively passing a first portion of the first beam and a second portion of the second beam received by the DMD along a projection path;
   receiving the first and second portion of the first beam at a dithering element;
   passively passing the first portion of the first beam along the projection path and the second portion along an offset path; and
   directing the first portion and second portion on to a screen to provide a dithered image.

2. The method of claim 1, the first LED comprising a first red LED, the second LED comprising a second red LED, the light source further comprising a first green LED transmitting at third peak wavelength, a second green LED transmitting at a fourth peak wavelength spectrally proximate the third peak wavelength, and a blue LED transmitting at a fifth peak wavelength, each peak wavelength disparate from other peak wavelengths.

3. The projector system of claim 2, the dithering element comprising a dichroic reflector operable to substantially reflect the second and the fourth peak wavelengths.

4. A method for providing a dithered image, comprising:
   transmitting a first light beam at a first peak wavelength and a second light beam at a second peak wavelength, the first peak wavelength disparate from the second peak wavelength;
   selectively passing a first portion of the first beam and a second portion of the second beam received a projection path; and
   passively passing the first portion of the first beam along the projection path and the second portion along an offset path.

5. The method of claim 4 further comprising directing the first portion and second portion on to a screen to provide a dithered image.

6. The method of claim 4, the light source comprising a first red LED transmitting at the first peak wavelength and a second red LED transmitting at the second peak wavelength, the first peak wavelength spectrally proximate the second peak wavelength.

7. The method of claim 4, the light source comprising a first green LED transmitting at the first peak wavelength and a second green LED transmitting at the second peak wavelength, the first peak wavelength spectrally proximate the second peak wavelength.

8. The method of claim 4, the light source comprising a first blue LED transmitting at the first peak wavelength and a second blue LED transmitting at the second peak wavelength, the first peak wavelength spectrally proximate the second peak wavelength.

9. The method of claim 4 further comprising receiving the first and second light beam at a DMD.

10. The method of claim 4 further comprising receiving the first and second portion at a dithering element.

11. The method of claim 10, the dithering element comprising a dichroic reflector operable to substantially reflect the second portion of the second beam within a wavelength range and an optical mirror to receive the substantially reflected second portion of the second beam and reflect the substantially reflected second portion along an offset path.

12. The method of claim 11, the dichroic reflector operable to substantially reflect incident light within a first and a second wavelength range, the first wavelength range disparate from the second wavelength range.

13. A projector system for providing a dithered image, comprising:

a light source capable of transmitting at least a first light beam at a first peak wavelength and a second light beam at a second peak wavelength, the first peak wavelength disparate from the second peak wavelength;

a spatial light modulator operable to receive the first beam and the second beam and selectively pass a first portion of the first beam and a second portion of the second beam along a projection path; and a dithering element operable to receive the first portion and the second portion and to passively pass the first portion along the projection path and the second portion along an offset path.

14. The projector system of claim 13 further comprising a screen operable to display the first portion and the second portion, the first displayed portion overlaps the second displayed portion by a fraction of a pixel.

15. The projector system of claim 13, the light source comprising a first red LED transmitting at the first peak wavelength and a second red LED transmitting at the second peak wavelength, the first peak wavelength spectrally proximate the second peak wavelength.

16. The projector system of claim 13, the light source comprising a first green LED transmitting at the first peak wavelength and a second green LED transmitting at the second peak wavelength, the first peak wavelength spectrally proximate the second peak wavelength.

17. The method of claim 13, the light source comprising a first blue LED transmitting at the first peak wavelength and a second blue LED transmitting at the second peak wavelength, the first peak wavelength spectrally proximate the second peak wavelength.

18. The projector system of claim 15, the light source further comprising a first green LED transmitting at a third peak wavelength, a second green LED transmitting at the fourth peak wavelength spectrally proximate the third peak wavelength, and a blue LED transmitting at a fifth peak wavelength, each wavelength disparate from other wavelengths, the third peak wavelength proximate the fourth peak wavelength.

19. The projector system of claim 13, the spatial modulator comprising a DMD.

20. The projector system of claim 13, the dithering element comprising a dichroic reflector operable to reflect at least a portion of light beams within a wavelength range.

21. The projector system of claim 20, the dithering element further comprising an optical mirror operable to receive the reflected portion of light beams and reflect the reflected portion along the offset path.

22. The projector system of claim 20, the dichroic reflector operable to substantially reflect incident light within a first and a second wavelength range, the first wavelength range disparate from the second wavelength range.

* * * * *